(12) United States Patent
Chen et al.

(10) Patent No.: US 8,819,209 B1
(45) Date of Patent: Aug. 26, 2014

(54) NAME SERVER PROPERTY TRACKING

(75) Inventors: Jeremy K. Chen, Piscataway, NJ (US);
Alexander D. Nizhner, New York, NY (US)

(73) Assignee: Google Inc., Mountain View, CA (US)

( * ) Notice: Subject to any disclaimer, the term of this patent is extended or adjusted under 35 U.S.C. 154(b) by 27 days.

(21) Appl. No.: 13/303,030

(22) Filed: Nov. 22, 2011

(51) Int. Cl.
*G06F 15/173* (2006.01)

(52) U.S. Cl.
USPC ........................................................ 709/223

(58) Field of Classification Search
USPC ........... 707/722, 721, 768; 709/203, 223, 227
See application file for complete search history.

(56) References Cited

U.S. PATENT DOCUMENTS

| | | | | |
|---|---|---|---|---|
| 6,332,163 | B1 * | 12/2001 | Bowman-Amuah | 709/231 |
| 2006/0101155 | A1 * | 5/2006 | Damour et al. | 709/238 |
| 2010/0023611 | A1 * | 1/2010 | Yang et al. | 709/223 |
| 2011/0270964 | A1 * | 11/2011 | Huang et al. | 709/224 |

OTHER PUBLICATIONS

Schneider (PCT/US01/08048).*

* cited by examiner

*Primary Examiner* — Joseph E Avellino
*Assistant Examiner* — Deforrest Bailey
(74) *Attorney, Agent, or Firm* — Fish & Richardson P.C.

(57) ABSTRACT

Methods, systems, and apparatus, including computer programs encoded on a computer storage medium, for determining a respective time period to send queries to each of a plurality of domain name system servers; generating a respective group of queries for each domain name system server of the plurality of domain name system servers, wherein each query in the respective group of queries is configured to cause the domain name system server to generate a respective response; for each domain name system server of the plurality of domain name system servers, sending the respective group of queries to the domain name system server according to the respective determined time period; receiving responses to the queries from the domain name system servers; and determining one or more different features for one or more domain name system servers in the plurality of domain name system servers based on the received responses.

20 Claims, 4 Drawing Sheets

NAME SERVER PROPERTY TRACKING

BACKGROUND

This specification relates to digital data processing and, in particular, to name server property tracking. Devices connected to the Internet (e.g., client devices and servers) can be assigned Internet Protocol (IP) addresses, which are numeric labels (e.g., 216.239.32.10), for purposes of locating and communicating with one another IP address. In some instances, a domain name system (DNS) can be employed to associate domain names with IP addresses, thereby allowing devices to be located using a domain name (e.g., example-.com) instead of a numeric IP address.

SUMMARY

In general, one aspect of the subject matter described in the specification can be embodied in methods that include the actions of determining a respective time period to send queries to each of a plurality of domain name system servers wherein the respective time period is determined based at least in part on historical query activity for the domain name system server; generating a respective group of queries for each domain name system server of the plurality of domain name system servers, wherein each query in the respective group of queries is configured to cause the domain name system server to generate a respective response; for each domain name system server of the plurality of domain name system servers, sending the respective group of queries to the domain name system server according to the respective determined time period; receiving responses to the queries from the domain name system servers; and determining one or more different features for one or more domain name system servers in the plurality of domain name system servers based on the received responses.

These and other aspects can optionally include one or more of the following features.

A particular domain name system server provides translation services between a domain name hierarchy and an IP address system. A particular query is a domain name system lookup request. A particular respective group of queries is generated from queries that have been previously sent to the domain name system server. A particular time period is determined based on a number of queries sent to the domain name system server over a span of time. Generating includes generating a group of queries for each domain name system server from one or more domain name system log files. The span of time is measured based on the average queries-per-second processed by the domain name system server over a specified span of time.

The queries in a particular respective group of queries for a particular domain name system server are used to determine one or more of the following features: whether the particular domain name system server is geosensitive, whether the particular domain name system server supports case-insensitive queries, the EDNS0 version supported by the particular domain name system server, whether the particular domain name system server supports EDNS0 options, the maximum EDNS0 buffer length supported by the particular domain name system server, whether the particular domain name system server supports DNSSEC, whether the particular domain name system server supports the TCP protocol, and the type of DNS software being run by the particular domain name system server.

Particular embodiments of the subject matter described in this specification can be implemented so as to realize one or more of the following advantages. Features of DNS servers can be determined and stored (e.g., server response times, support for geosensitive queries, support for DNS queries having mixed case characters (0x20), support for extension mechanisms for DNS (EDNS0), support for DNS security extensions (DNSSEC), support for transmission control protocol (TCP) communications, and the type of software being used by a DNS server). The determined features can be used to optimize processing of DNS requests received from devices. Test queries for determining features of DNS servers can be generated. Time periods for sending queries to DNS servers can be determined based on historical query activity for the DNS server.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
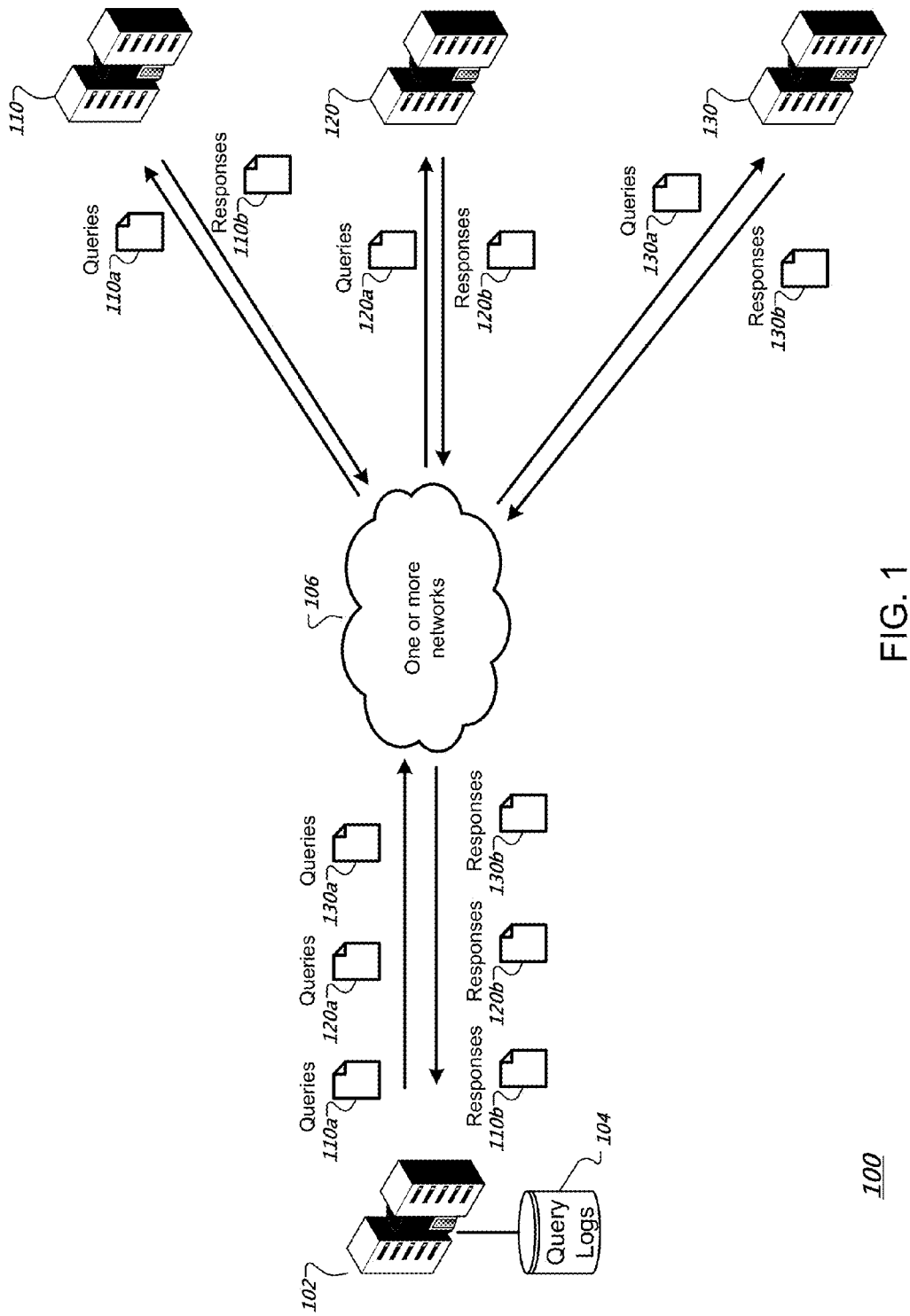
FIG. 1 illustrates interaction between a server and DNS servers in an example system.

Client devices connected to the Internet can send lookup requests to a DNS resolver (hereinafter "resolver") to look up IP addresses of domain names (e.g., "www.example.com"). Resolvers are typically tasked with sending received lookup requests to one or more DNS servers to translate a domain name into an IP address. In some instances, resolvers can process received lookup requests by returning a cached response to a previously answered query, thereby negating the need for sending an unnecessary query to a DNS server. DNS servers are typically used to map hostnames to their corresponding IP addresses (e.g., Internet protocol version 4 and Internet protocol version 6), text records (e.g., TXT records), mail exchange information (e.g., MX records), and name server information (e.g., NS records). In particular, DNS servers can vary in terms of software and features. For example, some DNS servers can be configured to communicate over the Internet using the User Datagram Protocol (UDP), some may use the Transmission Control Protocol (TCP), and others may use both UDP and TCP.

In various implementations, features of a DNS server can be identified by sending test queries to a DNS server and by analyzing the responses produced by the DNS server to the test queries. In particular, the features identified can be used by a resolver to process lookup requests received from clients. Some example features that can be determined by sending test queries include: whether a DNS server returns different IP addresses based on the geographic location of a client; whether a DNS server supports DNS extension mechanisms (e.g., EDNS0), including support for optional fields for resource records and the maximum supported buffer length; whether a DNS server is able to uniformly process queries containing mixed cases of domain names (e.g., 0x20 support); whether a DNS server supports mechanisms that provide resolvers with origin authentication of DNS data; whether a DNS server is able to authenticate denial of existence of DNS data; whether a DNS server supports data integrity (e.g., DNS Security Extensions); whether a DNS server supports queries transmitted using the Transmission Control Protocol (TCP); the type of DNS software being used by the DNS server; and the amount of time it takes for a DNS server to respond to a query. Other features are possible.

In some implementations, one or more test queries for testing a particular feature can be generated using query logs containing previously communicated lookup requests between a resolver and DNS servers. The generated test queries are tailored to test a particular feature of a DNS server (e.g., whether the DNS server supports mixed case lookup requests). In some other implementations, predefined test queries can be used to test features of DNS servers. In yet some other implementations, features of a DNS server can be determined using previously received responses for test queries. For example, timestamps of test queries and their corresponding responses can be used to determine the average response time of a DNS server.

In some implementations, time periods for sending test queries to DNS servers can be determined, such that features of DNS servers are tested at determined time periods (e.g., test DNS server D1 every 6 hours, DNS server D2 every 12 hours, and DNS server D3 every 72 hours). In some other implementations, throttling limits for sending test queries to each DNS server can be determined to prevent overburdening a DNS server with too many test queries over a given time span (e.g., limiting test queries sent to a DNS server to no more than 5 queries per second). Responses to test queries can be analyzed to identify whether a DNS server supports the tested feature. The identified features can be used by a resolver to process lookup requests received from clients.

FIG. 1 illustrates interaction between a server 102 and DNS servers 110, 120, and 130 in an example system 100. Server 102 interacts with DNS servers 110, 120, and 130 over a network 106, such as the Internet. The server 102 generates test queries 110a, 120a, and 130a to be sent to servers 110, 120, and 130, respectively. The test queries 110a, 120a, and 130a can be generated using query logs 104 containing records of lookup requests that were previously communicated between a resolver and DNS servers. The server 102 can determine time periods for sending test queries 110a, 120a, and 130a to their designated DNS servers. The server 102 can send the generated test queries over a network 106, such as the Internet, to DNS servers 110, 120, and 130 in accordance with their respective time periods. For example, the server 102 can determine that test queries should be sent to DNS servers 110, 120, and 130 every 6, 12, and 72 hours, respectively. In addition, the server 102 can determine throttling limits for sending test queries over a span of time to DNS servers 110, 120, and 130, such that the server 102 limits the number of queries sent to a DNS server at any given time. For example, the server 102 can determine that DNS servers 110, 120, and 130 are capable of accepting 3, 5, and 8 test queries per second, respectively. In this example, the server 102 can send DNS server 110 up to 3 test queries per second from the set of test queries 110a at any given time. Similarly, the server 102 can send 5 and 8 test queries per second to DNS servers 120 and 130, respectively, at any given time. Additional test queries can be sent by server 102 once the DNS servers 110, 120, and 130 process their respective test queries.

The DNS servers 110, 120, and 130 process the received test queries to produce responses 110b, 120b, and 130b, respectively. The responses 110b, 120b, and 130b can be sent back to the server 102 over a network 106, such as the Internet. The server 102 analyzes responses 110a to determine features associated with DNS server 110. Similarly, the server 102 analyses responses 120a and 130a to determine features associated with DNS servers 120 and 130, respectively. The determined features can be stored and accessed by a resolver for use in processing lookup requests from clients.

Figure 2:
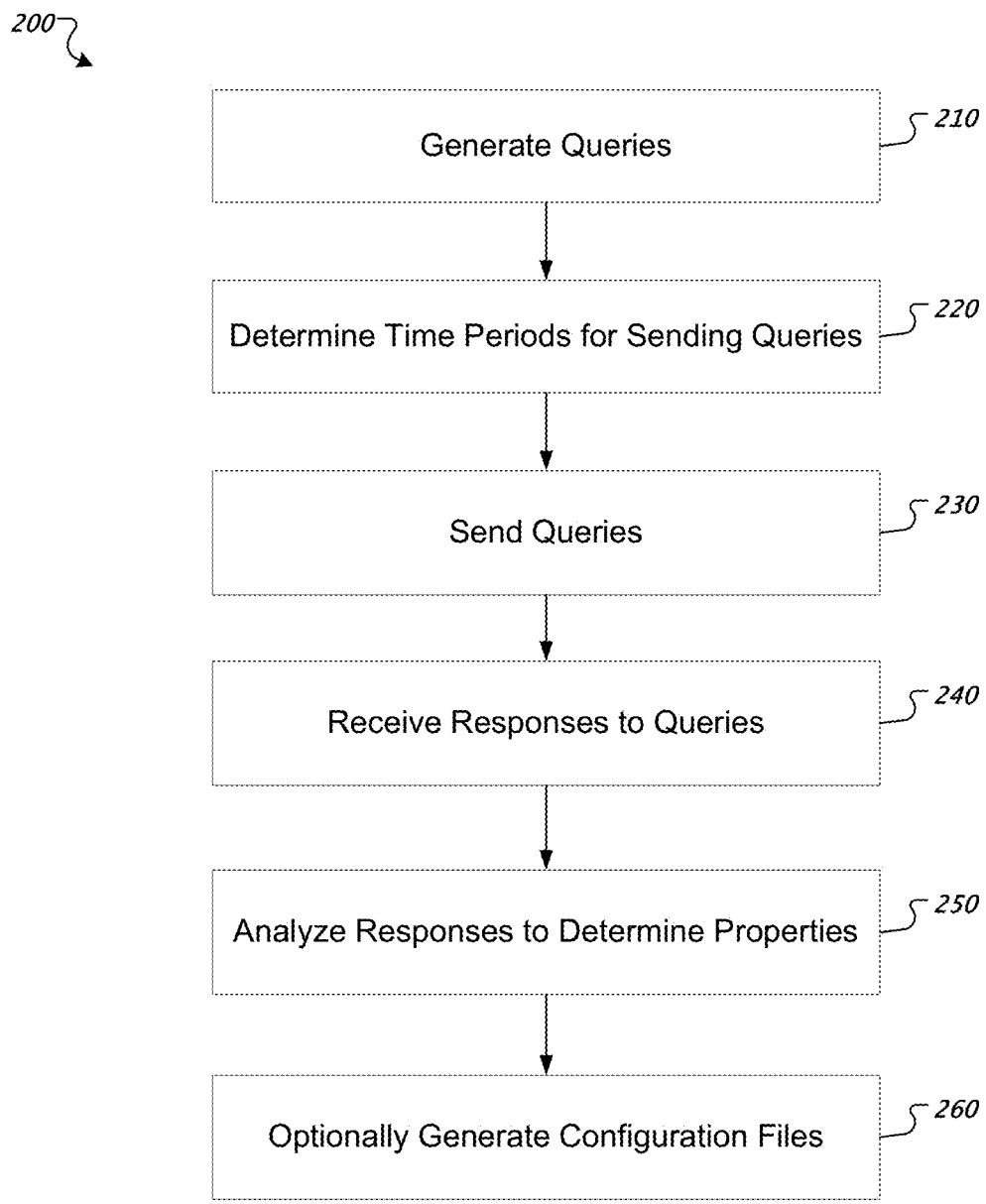
FIG. 2 is a flowchart of an example process for determining features of a DNS server.

FIG. 2 is a flowchart of an example process 200 for determining features of a DNS server.

The system generates test queries for DNS servers (step 210). In various implementations, test queries can be generated by sampling query logs containing records of test queries and lookup requests that were previously communicated between a resolver and DNS servers.

A sample query log can include the following records:

Jan. 12, 2011 10:03: 216.239.32.10: example.com: A
Jan. 12, 2011 10:15: 216.239.34.10: www.example.com: CNAME
Jan. 12, 2011 10:17: 216.239.36.10: www.example.com: NS
Jan. 12, 2011 10:21: 216.239.38.10: example.com: TXT
Jan. 12, 2011 10:22: 216.238.34.10: www.example.com: SOA Each line above represents a record in the query log. A given record represents a single query or lookup request. The first field in a record is a time stamp of when the query or lookup request was sent. The second field in a record is an IP address of a DNS server where the query or lookup request was sent. The third field in a record is a domain name to be translated. The fourth field in a record is the query type (e.g., "A" record, "CNAME" record, "NS" record, "TXT" record, or "SOA" record).

One example query record is an "A" record, or address record, which can be used to obtain the IP address that is associated with a given domain name. For example, an "A" record query for "example.com" may return the IP address "216.239.32.10". Similar to "A" records are "AAAA" records, which are address records that can be used to obtain a 128-bit IP version 6 address that is associated with a given domain name.

A query log may also contain "CNAME" records, or canonical name records, which can be used to obtain aliases of a domain that is already associated with an "A" record. The aliases can be used to associate different domain names with the same IP address. For example, a "CNAME" query for the subdomains "www.example.com" and "ftp.example.com" can return the same IP address. A "CNAME" query can be used to obtain a list of canonical name records associated with a particular domain and/or IP addresses associated with the particular domain.

Another type of query record is an "NS" record, or name server record, that can be used to obtain list of DNS servers that are authoritative for a given domain. For example, an "NS" record query for "example.com" may return a list of name servers "ns1.example.com, ns2.example.com, ns3.example.com" that are authoritative for the "example.com" domain.

Another type of query record is a "TXT" record, which can be used to obtain text associated with a DNS server. For example, a "TXT" query for "example.com" may return the type of software being used by a DNS server.

An "MX" record, or e-mail exchange record, can be used to obtain information on e-mail servers associated with a given domain. For example, an "MX" query for "example.com" may return "mail.example.com," which is the e-mail server that receives e-mail designated for the "@example.com" domain.

In addition, an "SOA" record, or State of Authority record, can be used to obtain various types of information associated with a domain name (e.g., the authoritative DNS server for that domain, the email of the domain administrator, the domain serial number, and timers relating to refreshing the zone).

A query log can also store information associated with previously sent test queries and lookup requests along with their corresponding responses. For example, in addition to storing previously sent test queries and lookup requests, and their corresponding responses, a query log can store a timestamp of the time a query was sent to the DNS server and a timestamp of the time a response was received from the DNS server.

The system can use these records to generate test queries for testing features associated with a DNS server. In some implementations, the system generates test queries for testing whether a DNS server supports geosensitivity. DNS servers that support geosensitivity can return different IP addresses in response to lookup requests depending on the location of the client sending the lookup request. For example, a geosensitive DNS server that receives a lookup request for "www.example.com" from a client located in San Francisco may return an IP address 216.232.34.10. However, that same DNS server may respond to the same request from a client located in New York, N.Y. with IP address 172.16.1.55. The system can generate test queries for testing geosensitivity by using previously sent queries from a query log (e.g., an A query for www.example.com) and sending that query from two or more different geographical locations to see if a DNS server returns different IP addresses. DNS servers that generate different responses are determined to be geosensitive. In some implementations, responses received from non-geosensitive DNS servers are stored in a cache that is shared amongst two or more resolvers, where responses that were received for queries sent to a non-geosensitive DNS server by a first resolver are used to process similar client lookup requests that are received by a second resolver.

The system can also generate test queries for testing whether a DNS server supports extension mechanisms for DNSs, or EDNS0. Extension mechanisms for DNSs can be used to expand the size of several parameters of the DNS protocol (e.g., increasing the buffer length of DNS server requests). Extension mechanisms for DNSs can also add optional fields in resource records, which can be used for sending and receiving information in DNS server lookup requests. In some implementations, EDNS0 support can be tested by using a predefined test query that sets an EDNS0 flag in the packet header of a DNS server lookup request. For example, a label type flag in the packet header of a predefined test query can be set to request EDNS0 communication. In particular, a response received (e.g., an error message) for this test query can indicate whether the DNS server supports EDNS0.

Test queries for testing whether a domain name system server returns different responses to queries containing mixed cases of domain names, or 0x20 support. For example, a DNS server that does not have 0x20 support will change the cases in the replies for lookup requests "www.ExAmple.cOm" and "www.example.com," even though both lookup requests are directed to the same domain. DNS servers that support 0x20 typically repeat the domain name that was transmitted in the lookup request in the same case. For example, a response for a lookup request "www.ExAmple.cOm" can repeat the domain name using the same case (e.g., "www.ExAmple.cOm"). However, DNS servers that do not support 0x20 will typically change the case for the domain name in the response. For example, a response to a lookup request "www.ExAmple.cOm" may repeat the domain name as "www.example.com." DNS servers that lack 0x20 support can be susceptible to DNS poisoning, which can result in incorrect processing of client lookup requests. In some implementations, 0x20 support can be determined by using queries that were previously sent to a DNS server (e.g., TXT queries, A record queries, NS queries, or CNAME queries) and modifying their cases. For example, using a query log, the system can determine that queries "www.example.com," "ftp.example.com," "mail.example.com," and "docs.example.com" were previously sent to a DNS server. The system can modify the cases for these previously sent queries to generate test queries (e.g., "wWw.eXampLe.cOm," "FTP.exAmPle.coM," "mAiL.eXAMple.Com," and "doCS.examPLe.cOM"). These test queries can be sent to the DNS server and their corresponding responses can be monitored to determine if the DNS server returns different IP addresses than the IP addresses that were received for the unmodified queries (e.g., "www.example.com," "ftp.example.com," "mail.example.com," and "docs.example.com"). A DNS server that returns the same IP addresses for the test queries can be determined to support 0x20 queries.

The system can also generate test queries for testing whether a DNS server supports DNS security extensions, or DNSSEC. DNS security extensions can be used to determine origin authentication of DNS data and to authenticate denial of existence of DNS data. In particular, DNS security extensions add records to DNS data which permit validation of data provided by a DNS server. In some other implementations, support for DNS security extensions can be tested by using a predefined test query that sets a flag in the packet header of a DNS server lookup request. A response to this predefined test query can include flags (e.g., a Checking Disabled flag or an Authenticated Data flag) indicating support for DNS security extensions. Additional flags in the packet header of the response can specify origin authentication of DNS data and authentication of denial of existence of DNS data.

Test queries for determining whether a DNS server supports queries transmitted using the Transmission Control Protocol (TCP) can be generated. DNS servers typically communicate using the User Datagram Protocol (UDP). Given the nature of the User Datagram Protocol, the sizes of lookup requests and their corresponding responses can be limited. In some situations, the Transmission Control Protocol can be used to communicate larger-sized lookup requests and responses between a resolver and a DNS server. In some implementations, the system generates test queries for testing Transmission Control Protocol support by using queries that were previously sent to a DNS server (e.g., TXT queries, A record queries, NS queries, or CNAME queries) and sending those test queries using the Transmission Control Protocol. A DNS server that responds to test queries sent using the Transmission Control Protocol can be determined to support communicate using this protocol.

The system can also use test queries to determine the type of software being used by a DNS server. In some implementations, test queries for determining the type of software being used by a DNS server can be generated using previously sent TXT queries (e.g., a TXT query for "www.example.com"). DNS server software can vary in the types of queries it is able to receive and process. For example, the BIND (Berkeley Internet Name Domain) DNS software has a special query "version.bind" that can be coupled with a TXT query and a CHAOS query class in order to determine the software type and version. This special query can be constructed using the "dig" DNS lookup command (e.g., "dig txt chaos version.bind").

Response times for receiving responses from DNS servers can also be determined. In some implementations, response times for receiving responses from a DNS server can be determined using timestamps of previously received responses to test queries and lookup requests. For example, timestamps of test queries and their corresponding responses can be obtained from a query log and can be used to determine a response time of a DNS server. In more detail, the system can use query logs to determine that a test query was sent to a DNS server at 10:00:10 am and a corresponding response was received at 10:00:12 am. Using this information, the system can determine that the DNS server took 2 seconds to respond to this test query. In some implementations, the system can sample multiple timestamps of test queries and lookup requests along with their corresponding responses to determine an average response time of a DNS server.

The system determines time periods for sending test queries to DNS servers (step 220). In some implementations, the system determines time periods for sending test queries to DNS servers by analyzing a query log. In particular, the system analyzes query logs to determine the number of queries that were previously sent to a given DNS server over a span of time to gauge the level of activity experienced by DNS servers. For example, a DNS server that is sent 100,000 queries every day can be determined to be a high-volume DNS server. In contrast, a DNS server that is sent 500 queries every day can be determined to be a low-volume DNS server. In particular, the system can increase or reduce the time periods for sending test queries to a particular DNS server depending on whether the DNS server is determined to be high-volume or low-volume. High-volume DNS servers may change their features often to accommodate increased workload. In such situations, the system can send test queries more often (e.g., every 6 hours) in order to maintain an up-to-date list of features associated with that DNS. In contrast, low-volume DNS servers may change their features less often, since they do not receive as many queries. Accordingly, the system can send such DNS servers test queries less often (e.g., every 72 hours). In some implementations, thresholds reflecting a numeric range of queries sent to a DNS server are used to determine a time period for sending queries. For example, DNS servers that are sent between 6,000 and 100,000 queries per day can be designated a time period of 24 hours.

The system sends test queries to DNS servers (step 230). In some implementations, test queries sent to a DNS server can be throttled to control the number of queries that are sent to a particular DNS server over a span of time. Throttling rates can be determined by analyzing query logs to count the number of test queries or lookup requests that were sent to a DNS server within a given time span and comparing that count to the number of corresponding responses that were received within the same time period. For example, if 9,000 queries were sent to a DNS server over a period of an hour, and 9,000 responses to those queries were received within the same time period, then the DNS server can process at least 2.5 queries per second. However, if 9,000 queries were sent to a DNS server over a period of an hour, but 3,600 responses to those queries were received within the same time period, then the DNS server can process no more than 1 query per second.

In particular, the system sends the test queries that were generated for each DNS server over a network (e.g., the Internet) in accordance with a time period that was determined for that DNS server (e.g., every 12 hours). In addition, the system throttles the number of queries sent using throttling rates that were determined for the DNS server. For example, if a DNS server "ns1.example.com" was previously determined to process 3 queries per second, the system sends test queries designated for "ns1.example.com" at a rate of 3 queries per second, or 10,800 queries per hour.

The system receives responses to queries from DNS servers (step 240). In more detail, the system receives responses to test queries that were sent by DNS servers. The responses can be received over a network (e.g., the Internet) and stored in a query log.

The system analyzes responses to determine features for the DNS servers (step 250). In some implementations, the system is able to determine if a DNS server supports geosensitivity if the DNS server returns different IP addresses depending on the location of the client sending the lookup request. In some other implementations, the system is able to determine if a DNS server supports EDNS0 by checking if the responses contain the EDNS0 version supported by the server, the maximum buffer length supported by the server, or support for optional fields in resource records. In yet some other implementations, the system is able to determine if a DNS server supports mixed case queries by checking if the DNS server returns the same responses for lower-case queries and for mixed case queries (e.g., the same response is returned for a query for "www.example.com" and a query for "wWw.eXaMplE.cOm"). In some implementations, the system is able to determine if a DNS server supports DNS security extensions by checking if flags in the packet header of the responses indicates such support (e.g., the flags indicate origin authentication of DNS data, authentication of denial of existence of DNS data, or data validation information). In some other implementations, the system is able to determine if a DNS server supports communication using the Transmission Control Protocol by checking of responses to queries sent using the Transmission Control Protocol were received. In yet some other implementations, the system is able to determine the software used by a DNS server by checking if the text of the responses indicates such information.

The system optionally generates configuration files for use by a resolver (step 260). In some implementations, the system generates a configuration file storing DNS server information (e.g., the domain, the IP address) and the features determined for that server. The configuration file can be used by a resolver to process client lookup requests. For example, a lookup request that requests information that would typically require multiple packets to be sent and received using the User Datagram Protocol can be sent using fewer packets if the resolver knows that the DNS server also supports communication using the Transmission Control Protocol. In another example, if a lookup request can be fulfilled by multiple DNS servers (e.g., "ns1.example.com" and "ns2.example.com"), the resolver can opt to send the lookup request to the DNS server with a better average response time.

Figure 3:
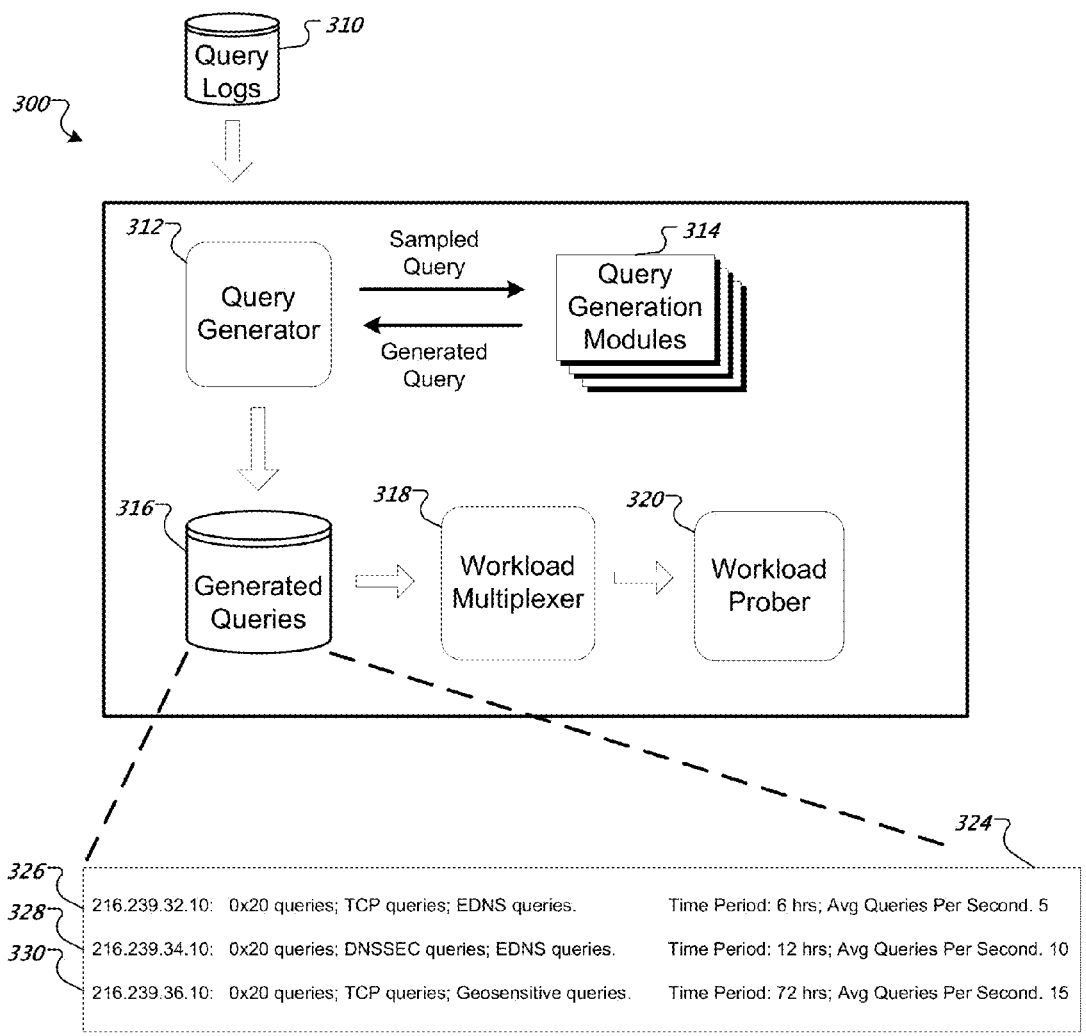
FIG. 3 is a diagram of an example server that generates and sends queries to determine features of DNS servers.

FIG. 3 is a diagram of an example server 300 that generates and sends test queries to determine features of one or more DNS servers. The server 300 includes a query generator 312, one or more query generation modules 314, generated test queries 316, a workload multiplexer 318, and a workload prober 320. The query generator 312 can generate test queries by sampling query logs 310. Query logs 310 can include test queries and lookup requests that were previously communicated between a resolver and DNS servers.

In particular, one or more query generation modules 314 can be used by the query generator 312 for generating test queries. Some example query generation modules include a module for generating queries to test geosensitivity (e.g., whether a DNS server returns different IP addresses based on the geographic location of a client), a module for generating queries to test whether a DNS server supports DNS extension mechanisms (e.g., EDNS0), a module to test whether a DNS server is able to uniformly process queries containing mixed cases of domain names (e.g., 0x20), a module for generating queries to test whether a DNS server supports DNS security extensions (e.g., origin authentication of DNS data, authentication of denial of existence of DNS data, and data integrity, a module for generating queries to test whether a DNS server supports queries communicated using the Transmission Control Protocol (TCP), a module for determining the type of DNS software being used by the DNS server, and a module for determining the amount of time it takes for a DNS server to respond to a query.

The query generator 312 can store the generated queries in a query index 316. An example table 324 corresponding to the query index 316 is shown. In particular, the table 324 contains entries 326, 328, and 330 corresponding to DNS servers for which features are to be tested. For example, the entry 326 corresponds to a DNS server with an IP address 216.239.32.10 and includes generated queries for testing whether the DNS server supports the 0x20, TCP, and EDNS0 features. The entry 326 also includes a time period and a throttling rate for sending queries (e.g., "Average Queries per Second") to the DNS server.

In some implementations, the workload multiplexer 318 can be used to determine how often test queries are sent to a particular DNS server. In particular, the workload multiplexer 318 can increase or reduce the time periods for sending test queries to a particular DNS server depending on how many lookup requests are received by that DNS server. For example, features associated with DNS servers that receive a high number of queries may change often to accommodate increased workload. In such situations, the workload multiplexer 318 can send test queries to high-volume DNS server more often (e.g., every 6 hours) so that features associated with that domain name system server are up to date. In contrast, features associated with domain name system servers that receive a low number of queries may change less often. Accordingly, the workload multiplexer 318 can send test queries to low-volume domain name system servers less frequently (e.g., every 72 hours).

In some implementations, test queries for determining multiple features can be interleaved and sent across multiple time periods. For example, in a case where there are 24 test queries for determining EDNS0 support and 24 test queries for determining TCP support, the system can send to a domain name system server 12 test queries for determining EDNS0 support and 12 test queries for determining TCP support during a first time period and can send the remaining 12 test queries for determining EDNS0 support and the remaining 12 test queries for determining TCP support during a second time period.

The workload prober 320 can be used to throttle the number of test queries that are sent to domain name system servers. For example, the workload prober 320 can limit the number of test queries sent to a domain name system server based on the number of queries per second that domain name system server is capable of processing.

Figure 4:
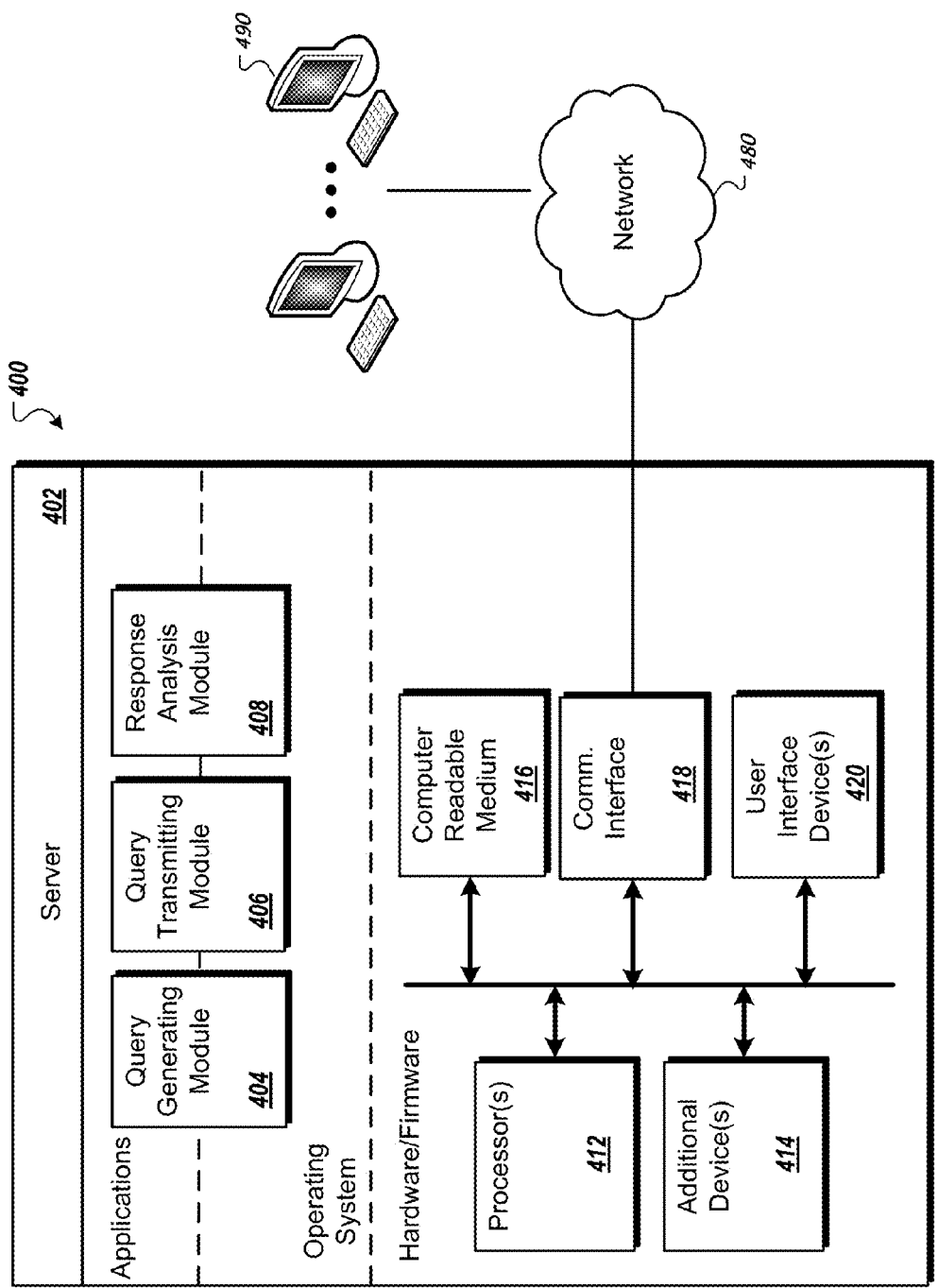
FIG. 4 is a schematic diagram of an example server.

FIG. 4 is a schematic diagram of an example server 402. The server 402 optionally connects to one or more domain name system servers 490 through a network 480. The server 402 consists of one or more data processing apparatuses. While only one data processing apparatus is shown in FIG. 4, multiple data processing apparatus can be used. The server 402 includes various software modules, e.g. executable software programs or libraries, including one or more of: a query generating module 404, a query transmitting module 406, and a response analysis module 408. Although several software modules are illustrated, there may be fewer or more software modules. Moreover, the software modules can be distributed on one or more data processing apparatus connected by one or more networks or other suitable communication mediums.

The server 402 also includes hardware or firmware devices including one or more processors 412, one or more additional devices 414, a computer readable medium 416, a communication interface 418, and one or more user interface devices 420. Each processor 412 is capable of processing instructions for execution within the server 402. In some implementations, the processor 412 is a single or multi-threaded processor. Each processor 412 is capable of processing instructions stored on the computer readable medium 416 or on a storage device such as one of the additional devices 414. The server 402 uses its communication interface 418 to communicate with one or more domain name system servers 490, for example, over a network 480. Examples of user interface devices 420 include a display, a camera, a speaker, a microphone, a tactile feedback device, a keyboard, and a mouse. The server 402 can store instructions that implement operations associated with the modules described above, for example, on the computer readable medium 416 or one or more additional devices 414, for example, one or more of a floppy disk device, a hard disk device, an optical disk device, or a tape device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, the method comprising:
   generating, using one or more processors, a respective group of test queries for each domain name system server of a plurality of domain name system servers, each respective group of test queries including a plurality of test queries, wherein each test query in the respective group of test queries is configured to cause the domain name system server to generate a respective response and is associated with one or more features of the domain name system server to be determined by analyzing the respective response, and wherein the features associated with one test query are different from the features associated with another test query within each respective group, and a particular respective group of test queries is generated from queries that have been previously sent to the domain name system server;
   determining a respective time period, for each of the domain name system servers, to send the respective test queries for the domain name system server to the domain name system server, wherein the respective time period is determined based at least in part on a count of test queries sent to the domain name system server over a span of time and a count of responses to the test queries received from the domain name system server over the same span of time;
   for each domain name system server of the plurality of domain name system servers, sending the respective group of test queries to the domain name system server according to the respective determined time period;
   receiving responses to the test queries from the domain name system servers;
   determining one or more different features for each of the one or more of the domain name system servers based on the received responses to the test queries, the different features for each domain name system server based on the one or more features associated with each test query sent to the domain name system server; and
   generating one or more configuration records for use by a domain name system resolver process, the one or more configuration records based on the one or more different features of the domain name system servers and configured to control one or more aspects of how the domain name system resolver process sends domain name system queries to the domain name system servers, wherein a particular respective group of test queries is generated from queries that have been previously sent to the domain name system server.

2. The method of claim 1 wherein a particular domain name system server provides translation services between a domain name hierarchy and an IP address system.

3. The method of claim 1 wherein a particular test query is a domain name system lookup request.

4. The method of claim 1 wherein the span of time is measured based on the average queries-per-second processed by the domain name system server over a specified span of time.

5. The method of claim 1 wherein generating comprises generating a group of test queries for each domain name system server from one or more domain name system log files.

6. The method of claim 1 wherein the test queries in a particular respective group of test queries for a particular domain name system server are used to determine one or more of the following features: whether the particular domain name system server is geosensitive, whether the particular domain name system server supports case-insensitive queries, the EDNS0 version supported by the particular domain name system server, whether the particular domain name system server supports EDNS0 options, the maximum EDNS0 buffer length supported by the particular domain name system server, whether the particular domain name system server supports DNSSEC, whether the particular domain name system server supports the TCP protocol, and the type of DNS software being run by the particular domain name system server.

7. The method of claim 1, wherein the one or more aspects of how the domain name system resolver process sends domain name system queries to the domain name system servers include at least one of: an order in which the domain name system resolver will send domain name system queries to the domain name system servers, a protocol to be used to send domain name system queries to a particular domain name system server, or one or more options supported by a particular domain name system server.

8. The method of claim 1, further comprising applying the one or more configuration records to the domain system resolver process.

9. A system comprising:
   one or more computing devices configured to interact with a non-transitory computer storage medium to perform operations comprising:
      generating, using one or more processors, a respective group of test queries for each domain name system server of a plurality of domain name system servers, each respective group of test queries including a plurality of test queries, wherein each test query in the respective group of test queries is configured to cause the domain name system server to generate a respective response and is associated with one or more features of the domain name system server to be determined by analyzing the respective response, and wherein the features associated with one test query are different from the features associated with another test query within each respective group, and a particular respective group of test queries is generated from queries that have been previously sent to the domain name system server;
      determining a respective time period, for each of the domain name system servers, to send the respective test queries for the domain name system server to the domain name system server, wherein the respective time period is determined based at least in part on a count of test queries sent to the domain name system server over a span of time and a count of responses to the test queries received from the domain name system server over the same span of time;

for each domain name system server of the plurality of domain name system servers, sending the respective group of test queries to the domain name system server according to the respective determined time period;

receiving responses to the test queries from the domain name system servers;

determining one or more different features for each of the one or more of the domain name system servers based on the received responses to the test queries, the different features for each domain name system server based on the one or more features associated with each test query sent to the domain name system server; and generating one or more configuration records for use by a domain name system resolver process, the one or more configuration records based on the one or more different features of the domain name system servers and configured to control one or more aspects of how the domain name system resolver process sends domain name system queries to the domain name system servers.

10. The system of claim 9 wherein a particular domain name system server provides translation services between a domain name hierarchy and an IP address system.

11. The system of claim 9 wherein a particular test query is a domain name system lookup request.

12. The system of claim 9 wherein the span of time is measured based on the average queries-per-second processed by the domain name system server over a specified span of time.

13. The system of claim 9 wherein generating comprises generating a group of test queries for each domain name system server from one or more domain name system log files.

14. The system of claim 9 wherein the test queries in a particular respective group of test queries for a particular domain name system server are used to determine one or more of the following features: whether the particular domain name system server is geosensitive, whether the particular domain name system server supports case-insensitive queries, the EDNS0 version supported by the particular domain name system server, whether the particular domain name system server supports EDNS0 options, the maximum EDNS0 buffer length supported by the particular domain name system server, whether the particular domain name system server supports DNSSEC, whether the particular domain name system server supports the TCP protocol, and the type of DNS software being run by the particular domain name system server.

15. A non-transitory computer storage medium encoded with a computer program, the program comprising instructions that when executed by data processing apparatus cause the data processing apparatus to perform operations comprising:

generating, using one or more processors, a respective group of test queries for each domain name system server of a plurality of domain name system servers, each respective group including a plurality of test queries, wherein each test query in the respective group of test queries is configured to cause the domain name system server to generate a respective response, and wherein each test in the respective group of test queries is associated with one or more features of the domain name system server to be determined by analyzing the respective response, and wherein the features associated with one test query are different from the features associated with another test query, and a particular respective group of test queries is generated from queries that have been previously sent to the domain name system server;

determining a respective time period, for each of the domain name system servers, to send the respective test queries for the domain name system server to the domain name system server, wherein the respective time period is determined based at least in part on a count of test queries sent to the domain name system server over a span of time and a count of responses to the test queries received from the domain name system server over the same span of time;

for each domain name system server of the plurality of domain name system servers, sending the respective group of test queries to the domain name system server according to the respective determined time period;

receiving responses to the test queries from the domain name system servers;

determining one or more different features for each of the one or more of the domain name system servers based on the received responses to the test queries, the different features for each domain name system server based on the one or more features associated with each test query sent to the domain name system server; and generating one or more configuration records for use by a domain name system resolver process, the one or more configuration records based on the one or more different features of the domain name system servers, and the one or more configuration records configured to control one or more aspects of how the domain name system resolver process sends domain name system queries to the domain name system servers.

16. The computer storage medium of claim 15 wherein a particular domain name system server provides translation services between a domain name hierarchy and an IP address system.

17. The computer storage medium of claim 15 wherein a particular test query is a domain name system lookup request.

18. The computer storage medium of claim 15 wherein the span of time is measured based on the average queries-per-second processed by the domain name system server over a specified span of time.

19. The computer storage medium of claim 15 wherein generating comprises generating a group of test queries for each domain name system server from one or more domain name system log files.

20. The computer storage medium of claim 15 wherein the test queries in a particular respective group of test queries for a particular domain name system server are used to determine one or more of the following features: whether the particular domain name system server is geosensitive, whether the particular domain name system server supports case-insensitive queries, the EDNS0 version supported by the particular domain name system server, whether the particular domain name system server supports EDNS0 options, the maximum EDNS0 buffer length supported by the particular domain name system server, whether the particular domain name system server supports DNSSEC, whether the particular domain name system server supports the TCP protocol, and the type of DNS software being run by the particular domain name system server.

* * * * *